United States Patent
Böhnig et al.

(10) Patent No.: US 7,096,136 B2
(45) Date of Patent: Aug. 22, 2006

(54) METHOD FOR DETECTING ROTATIONAL SPEED

(75) Inventors: Ralf Böhnig, Regensburg (DE); Achim Przymusinski, Lappersdorf (DE); Christian Stahl, Obertraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/790,424

(22) Filed: Mar. 1, 2004

(65) Prior Publication Data

US 2004/0163469 A1 Aug. 26, 2004

Related U.S. Application Data

(63) Continuation of application No. PCT/DE02/03303, filed on Sep. 6, 2002.

(30) Foreign Application Priority Data

Sep. 7, 2001 (DE) ........................ 101 43 954

(51) Int. Cl.
*G01P 3/481* (2006.01)
*G01P 21/00* (2006.01)

(52) U.S. Cl. ............................ 702/96; 73/1.37; 73/488; 73/494; 324/167; 324/207.25; 702/145; 702/147

(58) Field of Classification Search ................. 73/1.37, 73/488, 494, 506, 514.39; 324/167, 179, 324/207.25; 702/96, 145, 147–148
See application file for complete search history.

(56) References Cited

U.S. PATENT DOCUMENTS

| | | | | |
|---|---|---|---|---|
| 5,138,564 A | * | 8/1992 | de Jong et al. | 702/96 |
| 5,386,810 A | | 2/1995 | Gronenberg et al. | 123/436 |
| 5,537,322 A | * | 7/1996 | Denz et al. | 702/96 |
| 5,541,859 A | * | 7/1996 | Inoue et al. | 702/148 |
| 5,699,252 A | * | 12/1997 | Citron et al. | 701/111 |
| 6,334,094 B1 | * | 12/2001 | Hirakata et al. | 702/145 |
| 6,411,917 B1 | * | 6/2002 | Hirakata et al. | 702/145 |

FOREIGN PATENT DOCUMENTS

| | | |
|---|---|---|
| DE | 42 15 581 A1 | 11/1993 |
| DE | 44 10 127 A1 | 9/1995 |
| GB | 2134265 A | 8/1984 |
| GB | 2346449 A | 8/2000 |

* cited by examiner

*Primary Examiner*—Hezron Williams
*Assistant Examiner*—John C Hanley
(74) *Attorney, Agent, or Firm*—Baker Botts, L.L.P.

(57) ABSTRACT

In a method for detecting rotational speed of an internal combustion engine (1), a sector wheel (4) which is driven by the internal combustion engine (1) is scanned, the run of a specific segment of the sector wheel is detected, the duration of said segment-run is measured and a rotational speed value is determined therefrom, the duration of the run a specific segment is re-measured, a relative variation between two consecutive segment-runs is determined and the rotational speed value is determined therefrom.

20 Claims, 2 Drawing Sheets

METHOD FOR DETECTING ROTATIONAL SPEED

CROSS REFERENCE TO RELATED APPLICATION

This application is a continuation of copending International Application No. PCT/DE02/03303 filed Sep. 6, 2002 which designates the United States, and claims priority to German application no. 101 43 954.7 filed Sep. 7, 2001.

TECHNICAL FIELD OF THE INVENTION

The invention relates to a method for detecting a rotational speed of an internal combustion engine, wherein a sector wheel which is connected to a crankshaft is scanned and the duration of a pass of a segment of a sector wheel is ascertained in order to determine a rotational speed value, said segment having a specific size.

DESCRIPTION OF THE RELATED ART

Methods of this type for detecting rotational speed are usual in internal combustion engines, wherein it is normal to scan a toothed wheel having 60 teeth which is arranged on a crankshaft. As a result of the working principle of an internal combustion engine having continuous alternation between compression and expansion of the working gas, the rotational speed is not constant but is superimposed by a periodical oscillation which can arise from, in particular, differing torque contributions of individual cylinders of a multi-cylinder internal combustion engine, and therefore a time-relative averaging is normally carried out when detecting the rotational speed. This can be performed, for example, by scanning a plurality of teeth of the toothed wheel. The greater the number of scanned teeth, the smaller the interference of periodical oscillations on the determined rotational speed value. The shorter the scanned sector, the greater the error interference caused by these oscillations.

Since the duration of the segment pass is not known until the end of the segment, the rotational speed value is necessarily affected by a certain dead time. Furthermore, the detection of a segment of the sector wheel causes a certain averaging, which has a negative effect on the dynamics of the rotational speed signal.

The averaging when detecting the rotational speed represents a low-pass filtering. As a result, the rotational speed value which is currently present does not represent exactly the actual rotational speed of the internal combustion engine; rapid changes in rotational speed are only shown in the rotational speed value after a certain time delay.

SUMMARY OF THE INVENTION

The invention therefore addresses the problem of specifying a method for detecting the rotational speed in an internal combustion engine, in which method the current rotational speed of the internal combustion engine can be ascertained exactly and without time delay.

The object can be achieved by means of a method for ascertaining the rotational speed of an internal combustion engine, wherein a sector wheel which is driven by the internal combustion engine is scanned, a pass of a specific segment of the sector wheel is detected and the duration of this segment pass is measured and a rotational speed value is ascertained therefrom, a pass of a specific part of the segment is repeatedly detected and the duration of this part-segment pass is measured, a relative variation in the duration of the part-segment pass between two consecutive passes of the specific part of the segment is determined, and the relative variation is used to correct the rotational speed value.

The object can furthermore be achieved by an arrangement for ascertaining the rotational speed of an internal combustion engine, comprising a sensor for scanning a sector wheel which is driven by the internal combustion engine, means for detecting a pass of a specific segment of the sector wheel and measuring the duration of this segment pass and ascertaining a rotational speed value therefrom, means for detecting a pass of a specific part of the segment repeatedly, measuring the duration of this part-segment pass, and determining a relative variation of the duration of the part-segment pass between two consecutive passes of the specific part of the segment, and means for using the relative variation to correct the rotational speed value.

The internal combustion engine can be a multi-cylinder internal combustion engine and the means for detecting, measuring and determining may operate for four different part segments, wherein each part-segment coincides with a working stroke of a different cylinder. The relative variation can be associated multiplicatively with the rotational speed value. The means for detecting and measuring can operate repeatedly to determine a rotational speed value relationship between two consecutively ascertained rotational speed values, whereby the relative variation is determined per individual cylinder, and the means for detecting, measuring and determining can be operable to calculate a cylinder-specific correction factor by dividing the relative variation by the rotational speed ratio relationship, and the means for using can be operable to associate the cylinder-specific correction factor multiplicatively with the rotational speed value. The arrangement may further comprising a low-pass filter for filtering the cylinder-specific correction factor and a low-pass filter for filtering the relative variation. The means for detecting and measuring, the means for detecting, measuring and determining, and the means for using can be implemented by a microprocessor.

The concept of the present application therefore still ascertains a rotational speed value from the duration of the pass of a specific segment of the sector wheel. In this way, the width or size of the segment causes an averaging and a dead time, and consequently this rotational speed value does not yet have the desired currency.

Therefore, the duration of a part-segment pass is also detected and analyzed. By using the relationship of the variations, between two consecutive part-segment passes, of these durations, a correction of the rotational speed value is possible, whereby a rotational speed signal is obtained which has almost zero dead time in comparison with conventional low-pass filtering or averaging. Such a signal has an advantageous effect on the dynamic properties of various control circuits during the operation of an internal combustion engine (e.g. controlling the idle speed).

Because the relative variation, in the duration of the part-segment pass, between two consecutive passes of the specific part-segment is used for correcting the rotational speed value, information about the periodic recurrence of segment-specific oscillations is included when forming the rotational speed value. As a result, the rotational speed signal can be analyzed with almost zero dead time.

In the case of a multi-cylinder internal combustion engine, the individual cylinders normally produce different torque contributions as a result of manufacturing tolerances. Although this can be partially equalized by a corresponding cylinder equalization adjustment, the rotational speed of the internal combustion engine nonetheless also performs a periodic oscillation due to the different torque-producing work cycles of the individual cylinders. In this case, it can be assumed that a profile shape of the rotational speed curve remains unchanged in comparison with a preceding segment. Therefore the rotational speed correction in the method as claimed in the invention should preferably be designed such that it is cylinder-specific in the case of a multi-cylinder internal combustion engine, by ascertaining the duration of the pass of different part-segments, wherein each part-segment coincides with a working stroke of a different cylinder.

The number of different part-segments depends on the number of cylinders in the internal combustion engine. In the case of a four-cylinder internal combustion engine, four different part-segments are selected. Deviations in the aforementioned profile shape, which arise from differences between the individual cylinders, can therefore be compensated by the detections of the durations of the passes of different part-segments.

The detection of the relative variation makes it possible to avoid the dead time when ascertaining the rotational speed. The association of the relative variation with the rotational speed value, in order to obtain a correspondingly corrected rotational speed value, can be carried out in many suitable ways in this case. It is possible, for example, to convert the relative variation into an additive correction factor by means of a characteristic map, for example. However, it has emerged surprisingly that the relative variation can easily be associated multiplicatively with the rotational speed value in order to produce the appropriate correction.

For the correction, the time-relative variation between two consecutive passes of a specific part-segment is used. However, it was further shown that the time-relative variation of the rotational speed value itself also exhibits certain short-term influences. It is therefore preferable to use a method in which the duration of the segment pass is repeatedly detected and a rotational speed value relationship is formed from two consecutively determined rotational speed values, then the relative variation per individual cylinder is determined, and a correction factor per individual cylinder is calculated, wherein the relative variation is divided by the rotational speed value relationship. This cylinder-specific correction factor can then be multiplicatively associated with the rotational speed value.

This development advantageously considers the time-relative curve of the rotational speed value, thereby achieving greater stability of the method. The correction factor is determined per individual cylinder, i.e. for a pass of a part-segment in each case which coincides with the working stroke of a corresponding cylinder.

The stability can be further improved by applying a low-pass filter to the cylinder-specific correction factor. A certain learning function is induced at the same time, since the low-pass filtering also considers values of the cylinder-specific correction factors which were determined when the method was previously carried out.

This can also be achieved optionally or additionally by low-pass filtering of the relative variation itself.

BRIEF DESCRIPTION OF THE DRAWINGS

By way of example, the invention is explained below in greater detail with reference to the drawing, in which.

DETAILED DESCRIPTION OF THE PREFERRED EMBODIMENTS

Figure 1:
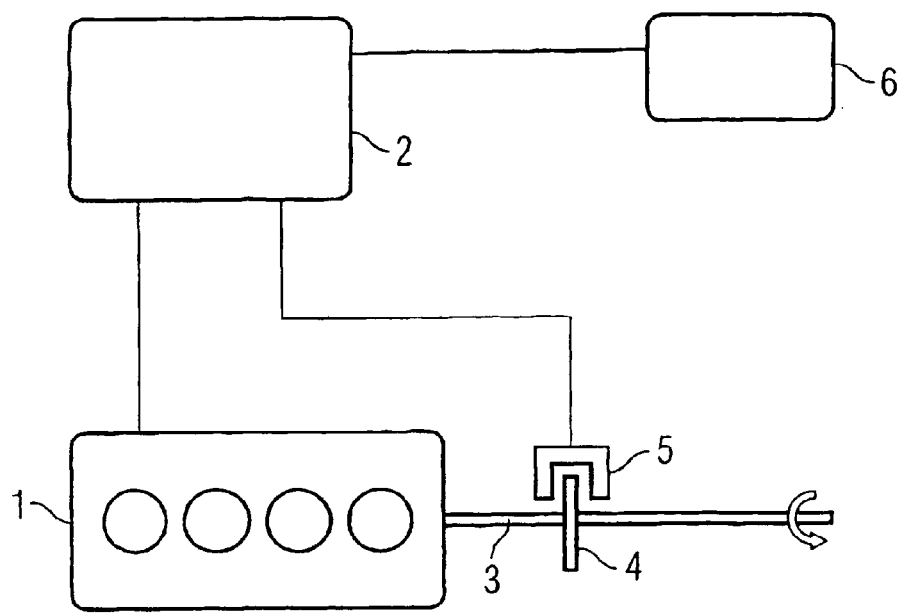
FIG. 1 shows a block schematic diagram of an internal combustion engine for which the rotational speed must be detected.

FIG. 1 is a schematic illustration of an internal combustion engine 1, whose operation is controlled by a control device 2 via lines which are not defined in detail. This control device 2 determines operating parameters of the internal combustion engine, e.g. the rotational speed N and the load, and assigns the internal combustion engine 1, which is a four-cylinder internal combustion engine in this schematically illustrated example, a quantity of fuel which is required for handling the operation.

The internal combustion engine 1 causes a crankshaft 3 to rotate, whereupon a motor vehicle (not shown) is driven. A sector wheel 4 having 60 teeth is arranged on the crankshaft 3. The teeth of the sector wheel 4 are sensed by an inductive or hall sensor 5, which conducts its signals to the control device 2 via lines which are not described.

By using the signals of the sensor 5, the control device 2 ascertains the information about the rotational speed N, said information being required for controlling the operation of the internal combustion engine 1. In a method not yet described for detecting the rotational speed, the control device 2 additionally accesses a correction module 6, which executes a correction not yet explained when ascertaining the rotational speed. In this case, the correction module 6 can also be designed as a software module for a microprocessor which is located in the control device 2.

In order to operate the internal combustion engine 1, the control device 2 requires knowledge of the current rotational speed N of the crankshaft 3. This information is required, for example, when ascertaining the amount of fuel to be injected into the cylinders of the internal combustion engine 1, which is a diesel internal combustion engine in this example, and when selecting the injection instant. For an optimum operation of the internal combustion engine, the rotational speed information should therefore be as current as possible and correspond to the actual rotational speed N of the crankshaft 3 at the instant when the injection is carried out.

The rotation of the crankshaft 3 is superimposed by periodical oscillations of rotational speed, which are due to different torque contributions of the individual cylinders of the four-cylinder internal combustion engine 1.

Figure 2:
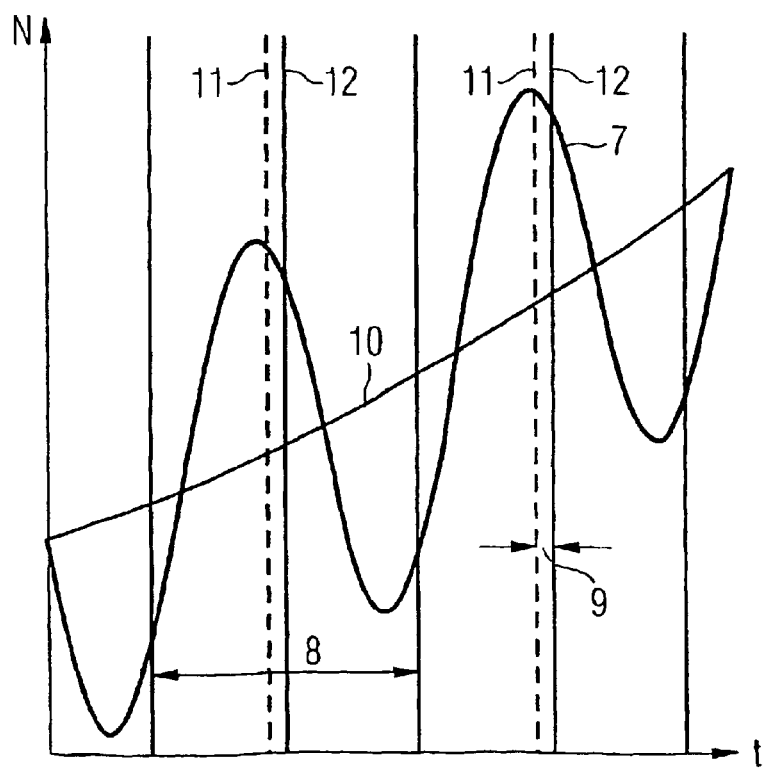
FIG. 2 shows a time series of the rotational speed curve of an internal combustion engine.

These fluctuations are easily recognizable in FIG. 2, in which the rotational speed N is plotted over the time t as a rotational speed curve 7. The average rotational speed 10 is additionally drawn as a thin line in the graph in FIG. 2.

During a segment of the sector wheel 4, the width of which segment is marked by 8 in FIG. 2, the rotational speed fluctuates clearly. As a result, a rotational speed N which does not correspond to the average rotational speed is present during a part-segment, the width of which is illustrated by 9 in FIG. 2.

In order accurately to ascertain the rotational speed, the pass time of the segment having the segment width 8 is detected by measuring the time which the pass of the corresponding teeth of the segment 4 takes at the fork light barrier 5. If the pass of all 60 teeth is detected in this way, the pass time which is determined represents directly the reciprocal value of the rotational frequency of the crankshaft 3. In the present case, however, it is assumed that the segment for which the pass time is ascertained contains 30 teeth. The measured pass time of T30_n would therefore have to be multiplied by 2 before the rotational frequency could be obtained by generating a reciprocal value. For the sake of simplicity, however, the quotient of the number of teeth in the segment (30 in the case of a four-cylinder internal combustion engine) and the pass time of the segment is used directly as a rotational speed value in the present case.

In addition to ascertaining a rotational speed value in this way, the pass of the part-segment having the part-segment width 9 is measured, said part-segment being located between the thinly sketched line 11 and the thickly sketched line 12 in FIG. 2. As explained below in greater detail, the duration Ta_n which is determined in this case for a part-segment pass is used for correcting the rotational speed value which is determined. For this purpose, the duration Ta_n of the part-segment pass is continuously detected, in the same way as the duration T30_n of the segment pass.

The element n or n-1 which is subsequently appended to the reference sign indicates whether the relevant variable was ascertained during the current pass of the sector wheel or during the previous pass. This element therefore represents a running index.

Figure 3:
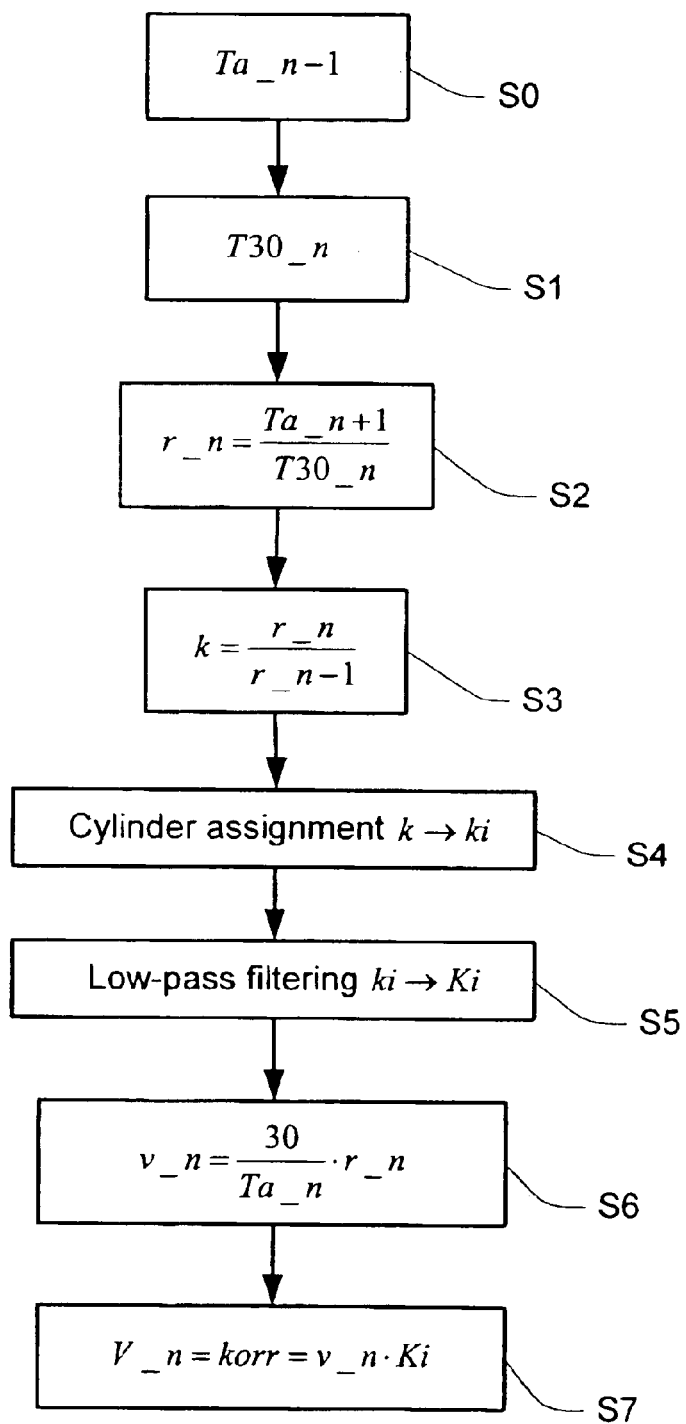
FIG. 3 shows a flowchart of a method for detecting the rotational speed.

In order to ascertain the rotational speed, the method which is schematically shown in FIG. 3 is carried out. Firstly, in a step S0, the duration Ta_n-1 of a part-segment pass is determined and stored. Then, in a step S1, the duration T30_n of a segment pass is detected. Then, in a step S2, a relationship r_n is ascertained, said relationship being obtained from the fraction of Ta_n-1 and T30_n in accordance with the following equation:

$$r\_n = \frac{Ta\_n-1}{T30\_n}. \quad (1)$$

The steps S0 to S2 are carried out continuously, the last two values of each variable being preserved in a memory in each case.

Then, in a step S3, a correction factor k is calculated in accordance with the following equation:

$$k = \frac{r\_n}{r\_n-1}. \quad (2)$$

Such correction factors k are determined for a plurality of part-segments, the individual part-segments being selected in such a way that exactly one part-segment is assigned to each work cycle of a multi-cylinder internal combustion engine.

Then, in a step S4, the corresponding cylinder assignment of the current correction factor values takes place, such that four correction factors k1 to k4 are present in the case of a four-cylinder internal combustion engine. The number of correction factors ki usually corresponds to the number of cylinders in the internal combustion engine 1.

Next, in a step S5, the correction factors are subjected to a low-pass filtering, such that a corresponding set of low-pass filtered correction factors K1 to K4 are present.

In order to calculate the rotational speed, a first rotational speed value is determined in a step S6 using the following equation:

$$v\_n = \frac{30}{Ta\_n} \cdot r\_n, \quad (3)$$

said value then being corrected in a step S7 by multiplication with the cylinder-specific, low-pass filtered correction factor Ki.

$$V\_n = v\_n \cdot Ki \quad (4).$$

In this way, of the set of correction factors, the correction factor Ki which is used for the correction is that which is assigned to the cylinder whose part-segment pass was measured last, and therefore that which was last entered into the calculation of the rotational speed v_n.

We claim:

1. A method for ascertaining the rotational speed of an internal combustion engine, comprising the steps of:
    a) scanning a sector wheel which is driven by the internal combustion engine,
    b) detecting a pass of a specific segment of the sector wheel and measuring the duration of this segment pass and ascertaining a rotational speed value therefrom,
    c) detecting a pass of a specific part of the segment repeatedly and measuring the duration of this part-segment pass and determining a relative variation of the duration of the part-segment pass between two consecutive passes of the specific part of the segment, and
    d) using the relative variation to correct the rotational speed value.

2. The method as claimed in claim 1, wherein the rotational speed of a multi-cylinder internal combustion engine is ascertained and a step c) is executed for four different part segments, wherein each part-segment coincides with a working stroke of a different cylinder.

3. The method as claimed in claim 2, wherein
    step b) is executed repeatedly and a rotational speed value relationship is formed between two consecutively ascertained rotational speed values,
    the relative variation is determined per individual cylinder,
    a cylinder-specific correction factor is calculated by dividing the relative variation by the rotational speed ratio relationship, and
    the cylinder-specific correction factor is associated multiplicatively in step d) with the rotational speed value.

4. The method as claimed in claim 3, wherein the cylinder-specific correction factor is low-pass filtered.

5. The method in claim 1, wherein the relative variation is associated multiplicatively with the rotational speed value.

6. The method as claimed in claim 1, wherein the relative variation is low-pass filtered.

7. A method for ascertaining the rotational speed of an internal combustion engine, comprising the steps of:
    a) scanning a sector wheel which is driven by the internal combustion engine,
    b) measuring a pass of a specific segment of the sector wheel and evaluating a rotational speed value therefrom,
    c) measuring a pass of a specific part of the segment repeatedly and determining a relative variation of the duration of the part-segment pass between two consecutive passes of the specific part of the segment, and
    d) using the relative variation to correct the rotational speed value.

8. The method as claimed in claim 7, wherein the rotational speed of a multi-cylinder internal combustion engine is ascertained and a step c) is executed for four different part segments, wherein each part-segment coincides with a working stroke of a different cylinder.

9. The method as claimed in claim 8, wherein
step b) is executed repeatedly and a rotational speed value relationship is formed between two consecutively evaluated rotational speed values,
the relative variation is determined per individual cylinder,
a cylinder-specific correction factor is calculated by dividing the relative variation by the rotational speed ratio relationship, and
the cylinder-specific correction factor is associated multiplicatively in step d) with the rotational speed value.

10. The method as claimed in claim 9, wherein the cylinder-specific correction factor is low-pass filtered.

11. The method in claim 7, wherein the relative variation is associated multiplicatively with the rotational speed value.

12. The method as claimed in claim 7, wherein the relative variation is low-pass filtered.

13. A arrangement for ascertaining the rotational speed of an internal combustion engine, comprising:
a sensor for scanning a sector wheel which is driven by the internal combustion engine,
means for detecting a pass of a specific segment of the sector wheel and measuring the duration of this segment pass and ascertaining a rotational speed value therefrom,
means for detecting a pass of a specific part of the segment repeatedly, measuring the duration of this part-segment pass, and determining a relative variation of the duration of the part-segment pass between two consecutive passes of the specific part of the segment, and
means for using the relative variation to correct the rotational speed value.

14. The arrangement as claimed in claim 13, wherein the internal combustion engine is a multi-cylinder internal combustion engine and the means for detecting, measuring and determining operate for four different part segments, wherein each part-segment coincides with a working stroke of a different cylinder.

15. The arrangement as claimed in claim 14, wherein the means for detecting and measuring operate repeatedly to determine a rotational speed value relationship between two consecutively ascertained rotational speed values, whereby the relative variation is determined per individual cylinder, the means for detecting, measuring and determining are operable to calculate a cylinder-specific correction factor by dividing the relative variation by the rotational speed ratio relationship, and the means for using are operable to associate the cylinder-specific correction factor multiplicatively with the rotational speed value.

16. The arrangement as claimed in claim 15, comprising a low-pass filter for filtering the cylinder-specific correction factor.

17. The arrangement in claim 13, wherein the relative variation is associated multiplicatively with the rotational speed value.

18. The arrangement as claimed in claim 13, comprising a low-pass filter for filtering the relative variation.

19. The arrangement as claimed in claim 13, wherein the means for detecting and measuring and the means for using are formed by a microprocessor.

20. The arrangement as claimed in claim 13, wherein the means for detecting, measuring and determining are formed by a microprocessor.

* * * * *